(12) United States Patent
Tusi et al.

(10) Patent No.: US 12,373,214 B2
(45) Date of Patent: Jul. 29, 2025

(54) DATA PARALLELISM

(71) Applicant: Meta Platforms Technologies, LLC, Menlo Park, CA (US)

(72) Inventors: Reza Tusi, San Jose, CA (US); Tomonari Tohara, Sunnyvale, CA (US); David Vakrat, Kfar Saba (IL); Javid Jaffari, San Diego, CA (US); Yuan Liu, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/525,172

(22) Filed: Nov. 30, 2023

(65) Prior Publication Data

US 2024/0220255 A1    Jul. 4, 2024

Related U.S. Application Data

(60) Provisional application No. 63/477,543, filed on Dec. 28, 2022.

(51) Int. Cl.
*G06F 9/30* (2018.01)

(52) U.S. Cl.
CPC ........ *G06F 9/3013* (2013.01); *G06F 9/30036* (2013.01)

(58) Field of Classification Search
CPC .................... G06F 9/30036; G06F 9/3013
See application file for complete search history.

(56) References Cited

U.S. PATENT DOCUMENTS

| | | | |
|---|---|---|---|
| 6,067,613 A | 5/2000 | Balmer | |
| 6,175,892 B1 | 1/2001 | Sazzad et al. | |
| 6,625,721 B1 | 9/2003 | Chen | |
| 6,804,771 B1 | 10/2004 | Jung et al. | |
| 10,423,413 B2 * | 9/2019 | Anderson | G06F 9/30032 |
| 2002/0198911 A1 | 12/2002 | Blomgren et al. | |
| 2003/0084080 A1 | 5/2003 | Hong | |
| 2003/0159016 A1 | 8/2003 | Barlow et al. | |
| 2004/0168019 A1 | 8/2004 | Barlow et al. | |

(Continued)

OTHER PUBLICATIONS

Ciobanu C., et al., "A Polymorphic Register File for Matrix Operations," International Conference on Embedded Computer Systems: Architectures, Modeling and Simulation, IEEE, 2010, pp. 241-249.

(Continued)

*Primary Examiner* — Zachary K Huson
(74) *Attorney, Agent, or Firm* — Morgan, Lewis & Bockius LLP (57) ABSTRACT

In one embodiment, a computing system may set data to a first group of registers. The first group of registers may be configured to be accessed during a single operation cycle. The system may set a number of patterns to a second group of registers. Each pattern of the number of patterns may include an array of index for the data stored in the first group of registers. The system may select, for a first vector register associated with a vector engine, a first pattern from the patterns stored in the second group of registers. The system may load a first portion of the data from the first group of registers to the first vector register based on the first pattern selected for the first vector register from the patterns stored in the second group of registers.

20 Claims, 4 Drawing Sheets

(56) References Cited

U.S. PATENT DOCUMENTS

| | | |
|---|---|---|
| 2004/0172517 A1 | 9/2004 | Prokopenko et al. |
| 2004/0236920 A1 | 11/2004 | Sheaffer |
| 2005/0108503 A1 | 5/2005 | Sandon et al. |
| 2006/0036801 A1 | 2/2006 | Jones et al. |
| 2006/0107026 A1 | 5/2006 | Oh |
| 2008/0082798 A1 | 4/2008 | Bloomfield et al. |
| 2012/0203730 A1* | 8/2012 | Biran ............ G06N 5/025 706/48 |
| 2013/0067203 A1* | 3/2013 | Chung ........... G06F 9/30032 712/222 |
| 2016/0224344 A1* | 8/2016 | Moudgill ....... G06F 9/30101 |
| 2019/0042248 A1 | 2/2019 | Bradford et al. |
| 2019/0114147 A1 | 4/2019 | Aly et al. |
| 2020/0125335 A1 | 4/2020 | Neoh |
| 2021/0200541 A1 | 7/2021 | Zhang et al. |

OTHER PUBLICATIONS

Jung Y., et al., "A Register File with Transposed Access Mode," Proceedings 2000 International Conference on Computer Design, Sep. 2000, pp. 559-560.

Non-Final Office Action mailed Apr. 14, 2025 for U.S. Appl. No. 18/525,217, filed Nov. 30, 2023, 32 pages.

\* cited by examiner

DATA PARALLELISM

PRIORITY

This application claims the benefit under 35 U.S.C. § 119(e) of U.S. Provisional Patent Application No. 63/477,543, filed 28 Dec. 2022, which is incorporated herein by reference.

TECHNICAL FIELD

This disclosure generally relates to computer technology, in particular to register file design in processors.

BACKGROUND

A computer can be programmed to carry out sequences of arithmetic operation or logical operations automatically. Modern computers can perform generic programs. These programs enable computers to perform a wide range of tasks using processors, memories, and register files. A register file is an array of processor registers in a central processing unit (CPU) or digital signal processor (DSP). Register banking uses a single name to access multiple different physical registers depending on the operating mode. Modern integrated circuit-based register files are usually implemented by way of fast static RAMs having read and write ports.

SUMMARY OF PARTICULAR EMBODIMENTS

Particular embodiments of this disclosure relate to systems and methods of using a micro-gathering process to prepare the data for the data processing pipeline of the vector engine to improve the utilization level of the vector engine and using a micro-scatter process to organize the output data of the vector engine for the downstream data processing operations. The micro-gathering architecture may include a first group of registers which may be an array of state registers that can be accessed during a single operation cycle. In other words, all or a sub-group of the first group of registers may be accessed during a single operation cycle (e.g., a reading cycle or a writing cycle). Such registers may be referred to as "two dimensional registers" or "2D registers" in contrast to the traditional one-dimensional (1D) registers, which can only be accessed in a row-by-row or column-by-column order (with each row or column requiring at least one operation cycle). The first group of registers may correspond to one page of memory size.

For the micro-gathering process, the CPU/DSP may first load one page of data from the memory to the first group of registers. Or, alternatively, the CPU/DSP may set data to the first group of registers according to the data processing results of previous computation of the vector engine or an intermediate result of a computation process. After that, the CPU/DSP may set a number of patterns to a second group of registers which may be an array of index registers to store the indexes/addresses for the data stored in the first group of registers. Such patterns may be pre-determined according to the problems to be solved. Each pattern may include an array of indexes for accessing the first group of registers. Then, the CPU/DSP may select, from the patterns stored in the second group of registers, a first pattern for a first vector register and a second pattern for a second vector register. Both vector registers may be in the data processing pipeline to prepare and feed the data to the vector engine. After that, the CPU/DSP may load, from the data stored in the first group of registers, a first portion of the data to the first vector register in an order according to the first pattern, and load a second portion of the data to the second vector register in an order according to the second patterns. The two patterns for the two vector registers may be different patterns independent from each other. At last, the two vector registers may feed their data to the vector engine which perform the computation on those data. By using the micro-gathering process to reorganize and prepare data for the vector engine, the CPU/DSP may significantly achieve a high level of utilization of the vector engine (up to 100%).

For the micro-scatter process, the CPU/DSP may use other group of registers which are different register group from the register groups used in the micro-gather process. The vector engine may first load the output data to a third group of registers, which may be state registers for temporally storing the output data. Then, the CPU/DSP may determine a number of patterns to map the output data in the state registers to a memory space or another group of registers. Such patterns may be determined based on the subsequent operation or computation upon the output data. Then, the CPU/DSP may set the patterns to a fourth group of registers, which may be an array of index registers. Each pattern may include a number of indexes to access the output data in the third group of registers. After that, the CPU/DSP may load the output data from the third group of registers to a memory space or another group of registers, according to one or more patterns selected from the pattens in the fourth group of registers. As a result, by using the micro-scatter process, the CUP/DSP may efficiently prepare the data for subsequent operations and computations.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Traditional CPU/DSP having vector engine (also referred to as "vector machine," "vector processor" or "vector unit") with SIMD instructions may be instrumental in accelerating algorithms. However, the architecture with a wide bandwidth can be challenging to achieve high utilization because the size and dimension of the data to be process could be unfitted to the bandwidth of the data processing pipeline associated with the vector engine. For example, if the bandwidth matrix dimension of the data processing pipeline is 16×16, but the actual dimension of the data to be processed is 3×16, the vector engine would waste 13 out of 16 computation capability. As such, for multiplication of Matrices of different dimensions, it will be difficult for traditional CPU/DSP to arrange data in memory to maximize the utilization of the vector engine. To have higher utilization of the vector machine, the CPU/DSP needs to prepare the data in the right order before feeding them to the vector engine. However, if software is used to reorganize and prepare the data to the bandwidth of the data processing pipeline, the data preparing process could use more instruction cycles than the computation process, wasting significant time and computation resource.

To solve these problems, particular embodiments of this disclosure relate to systems and methods of using a micro-gather process to prepare the data for the data processing pipeline of the vector engine to improve the utilization level of the vector engine and using a micro-scatter process to organize the output data of the vector engine for the downstream data processing operations. The micro-gather architecture may include a first group of registers which may be an array of state registers that can be accessed during a single operation cycle. In other words, all or a sub-group of the first group of registers may be accessed during a single operation cycle (e.g., a reading cycle or a writing cycle). Such registers may be referred to as "two dimensional registers" or "2D registers" in contrast to the traditional one-dimensional (1D) registers, which can only be accessed in a row-by-row or column-by-column order (with each row or column requiring at least one operation cycle). The first group of registers may correspond to one page of memory size.

For the micro-gather process, the CPU/DSP may first load one page of data from the memory to the first group of registers. Or, alternatively, the CPU/DSP may set data to the first group of registers according to the data processing results of previous computation of the vector engine or an intermediate result of a computation process. After that, the CPU/DSP may set a number of patterns to a second group of registers which may be an array of index registers to store the indexes/addresses for the data stored in the first group of registers. Such patterns may be pre-determined according to the problems to be solved. Each pattern may include an array of indexes for accessing the first group of registers. Then, the CPU/DSP may select, from the patterns stored in the second group of registers, a first pattern for a first vector register and a second pattern for a second vector register. Both vector registers may be in the data processing pipeline to prepare and feed the data to the vector engine. After that, the CPU/DSP may load, from the data stored in the first group of registers, a first portion of the data to the first vector register in an order according to the first pattern, and load a second portion of the data to the second vector register in an order according to the second patterns. The two patterns for the two vector registers may be different patterns independent from each other. At last, the two vector registers may feed their data to the vector engine which perform the computation on those data. By using the micro-gather process to reorganize and prepare data for the vector engine, the CPU/DSP may significantly achieve a high level of utilization of the vector engine (up to 100%).

For the micro-scatter process, the CPU/DSP may use other group of registers which are different register group from the register groups used in the micro-gather process. The vector engine may first load the output data to a third group of registers, which may be state registers for temporally storing the output data. Then, the CPU/DSP may determine a number of patterns to map the output data in the state registers to a memory space or another group of registers. Such patterns may be determined based on the subsequent operation or computation upon the output data. Then, the CPU/DSP may set the patterns to a fourth group of registers, which may be an array of index registers. Each pattern may include a number of indexes to access the output data in the third group of registers. After that, the CPU/DSP may load the output data from the third group of registers to a memory space or another group of registers, according to one or more patterns selected from the patterns in the fourth group of registers. As a result, by using the micro-scatter process, the CUP/DSP may efficiently prepare the data for subsequent operations and computations.

To accelerate the small matrix multiplications with a vector floating point engine (VFE), the implementation may be limited by the capability of the native core instructions to gather and arrange the inputs of the vector engine (e.g., a 16-way SIMD single precision vector floating point engine (VFE)). This deficiency may limit the utilization of the vector engine to less than 50% for all the cases and it is difficult for the native instructions to achieve better than 50% utilization. And on top of that, the inherent characteristics of the problem may make the situation worse and push the performance even lower. The systems, methods, and processes described in this disclosure may allow CPU/DSP to achieve 100% utilization in solving problems by introducing a novel programmability in gathering data. Typical utilization of traditional vector engine can be very low (e.g., 30% or 40%), which causes a lot of waste in the computation resources. Using the micro-gather and micro-scatter mechanism, the CPU/DSP could have the potential to push to 100% utilization of the vector machine. Furthermore, by using the micro-gather and micro-scatter mechanism, the CPU/DSP may reduce the instruction cycles and steps needed in preparing the data to be ready for next stage process by the vector engine to improve the utilization level of the vector engine, improving the CPU/DSP efficiency and data processing speed.

Figure 1:
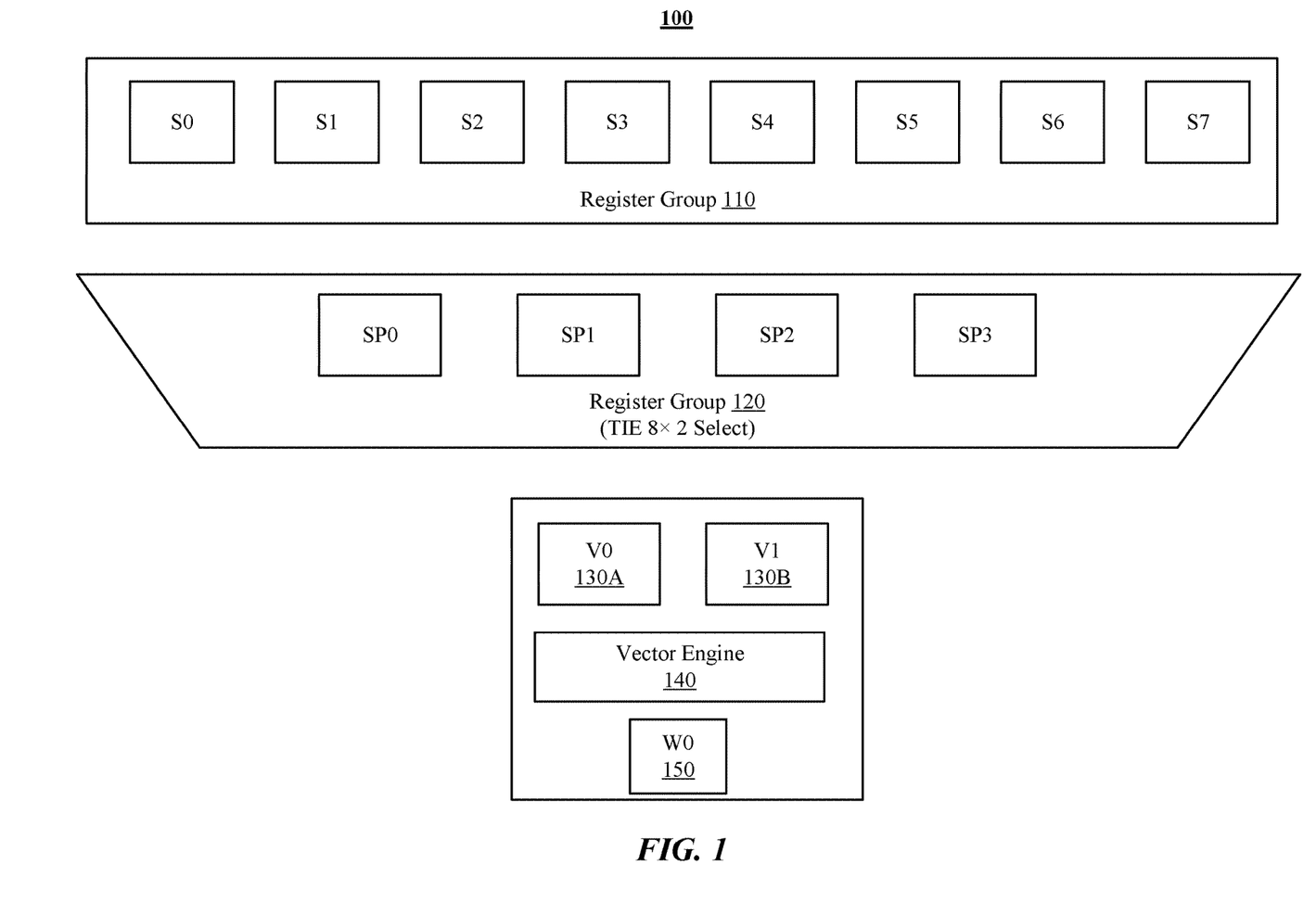
FIG. 1 illustrates an example architecture used in a micro-gathering process.

FIG. 1 illustrates an example architecture 100 used in a micro-gathering process. As an example and not by way of limitation, the vector engine of the acceleration unit may support fully programmable 8×2 select operations which would enable the DSP/CPU to gather and rearrange almost any 16 floating point values from the 128 floating point values in the 2D registers. The first register group 110 may include a number of state registers (e.g., S0, S1, S2, S3, S4, S5, S6, S7) for storing data. The first register group 110 may have a memory size corresponding to one page (e.g., 1 Kbytes, 2 Kbytes, 4 Kbytes, 8 Kbytes) of the memory (e.g., a single cycle memory (SCM)) of the CPU/DSP. In this example, the first register group 110 may include 8 registers to hold 128 floating point values (with each single register holding 16 floating point values). The vector registers V0

130A and V1 130B may be within the data processing pipeline of the vector engine 140 and feed data to the vector 140 for processing. In this example, each vector register 130A and 130B may hold 32 floating point values for the vector engine 140 to process. As such, in this example, the micro-gather operations may need to select 32 numbers for each vector register (130A, 130B) out of the 128 numbers stored in the registers of the first register group 110.

The vector registers 130A and 130B may each have a fixed length N to hold a vector with N elements for the vector engine 140 to process. As such, the computation capacity bandwidth of the vector engine 140 may correspond to the dimension of N×N. Thus, for each computation operation performed by the vector engine 140, the computation may be in the dimension of N×N regardless of whether actual data dimensions are greater or smaller. In case the data that needs to be processed has greater dimensions than the vector registers, the data may need to be broken down into small chunks to fit the size of the register vectors and may need to be processed in multiple computation iterations. In case the data that needs to be processed has smaller dimensions that the vector registers, the extra computation capacity may be wasted, resulting in reduced utilization. To solve these problems, the CPU/DSP may use the micro-gathering architecture and process to reorganize and prepare the data to fit the size of the vector register 130A and 130B, before feeding the data to the vector engine 140.

In particular embodiments, the CPU/DSP using the micro-gathering architecture and process may determine a number of patterns for mapping the data stored in the registers of the first register group 120 to the two vector registers 130A and 130B (V0 and V1). These patterns may be determined based on the problems that need to be solved by the vector engine 140. In the context matrix computation, the patterns may be determined by solving the problems with close form solutions based on the equations for the matrix computation (e.g., matrix multiplication). Each pattern may include a number of indexes or addresses for accessing the data stored in the first register group. Each pattern may correspond to a close form solution of one or more problems to be solved. The patterns may map the data stored in the first register group 110 to the two vector registers 130A and 130B in particular orders and arrangement for the vector engine to process. For the problems to be solved by the vector engine, these patterns may be pre-determined and stored in a data storage. The CPU/DSP using the micro-select architecture may allow programmers to use a set of micro-selection instructions to set the registers in the first register group 110 and the second register group 120 to particular numbers. When solving the problems, the micro-selection instructions may set the patterns to the registers in the second register group 120. As a result, these patterns may be stored in the second register group 120. In this example, the second register group 120 may include four registers (SP0, SP1, SP2, SP3) for storing 16 patterns. Each pattern may include an array of indexes or address according to which the data (e.g., 128 floating point values) stored in the first register group 110 may be accessed and loaded to the two vector registers 130A and 130B. For example, if the first register group 110 stores 128 floating point value in total, each pattern stored in the second register group 120 may include index/address values ranged from 0 to 127.

For example, the CPU/DSP may need to solve thousands of 2×3 and 3×2 dimensions matrix multiplications with the data resides in the memory. Then, some filters/sorters may be used to sort the data into pages (e.g., 4 KB per page). The micro-gathering process as described here may be used to sort and arrange the data in a manner (e.g., size and order) that fit the vector registers 130A and 130B, which provide data to the vector engine 140. The output data may be again 2×3 or 3×2 matrix, which may be put back to the memory (using a micro-scattering process as described later. By preparing the data using the micro-gathering process, the CPU/DSP may achieve a higher level of utilization and parallelism, by eliminating many repeated steps related to the data pipeline without micro-gathering.

In particular embodiments, in addition to the set of initial patterns, the CPU/DSP may use offset and initial patterns to generate new patterns to cover more possibility of patterns. For example, the initial patterns may include N different patterns. By using an offset to shift an initial pattern, the CPU/DSP may generate up to a new pattern, which has the same index/address sequence with the initial pattern but with different starting and ending positions. For example, the second register group 120 may include 4 state registers to hold 16 patterns. The vector register V0 and V1 may be independent to each other or may have correlated vectors based on the nature of the problems to be solved. The CPU/DSP may use two independent offsets for the two vector registers 130A and 130B. By using the offsets to generate new patterns based on the initial patterns, the choices for navigating and gathering for the micro-gathering process may be increased to 16*127 or 2032, which is sufficient for most problems to be solved.

In particular embodiments, the DSP/CPU using the micro-gathering architecture and process may swap the initial patterns (e.g., 16 patterns) at any time and create new choices for the micro-gathering process. The 8×2 selection operation may not need to tie to the vector engine 140 and the initial patterns and/or the patterns generated by offset shifting may be reused any procedure related to the micro-gathering and/or micro-scattering process in the computation pipeline.

In particular embodiments, the registers in the first register group 110 may be 2D registers, which can be accessed during a single operation cycle (e.g., a reading operation cycle or a writing operation cycle). These 2D registers may be accessed in any order according to the indexes or addressed provided to the I/O interface of the 2D registers. In this disclosure, the term "two-dimensional registers" "2D registers", "2D register file," "2D register array," or "2D register bank" may refer to a group of registers or an array of registers that are configured to allow accessing to all or a sub-group of the registers during a single operation cycle (e.g., a reading operation cycle or a writing operation cycle). These registers may be accessed during multiple operation cycles when needed but are capable of being accessed all at once during one single operation cycle. In contrast, traditional one-dimensional (1D) registers may need to be accessed row-by-row or column-by-column order, with each row or column requiring at least one operation cycle. In particular embodiments, the 2D registers may be realized by any storage technology that allows single cycle concurrent access to all register elements of the array. As such, the 2D registers may be implemented with a flat SRAM array or 1 row, multi-port register files, or flat array of registers. All the registers in the 2D register array may be connected to a data I/O interface which may have the bandwidth to allow all registers in the 2D register array to be accessed during a single operation cycle. The I/O interface may include a reading port to support reading operations and a writing port to support writing operations. During a reading or writing operation, the system may provide the register addresses to the data I/O interface to read or write the data from the corresponding register elements. The addresses may be provided according to a particular order, according to which the data is read out from the 2D registers. In this disclosure, the term "vector register" may refer to a fixed length register bank for holding a single vector. In this disclosure, "setting data or a pattern to a register" may refer to the operations of using instructions to set the register content to be consistent with (e.g., a copy of) the content (e.g., numbers) of the data or pattern.

In the example shown in FIG. 1, the first register group 110 of the CPU/DSP may have 8 state registers to hold 128 floating point values for the micro-gathering process. The second register group 120 may include 4 registers to hold 16 patterns for the micro-gathering process. However, it is notable that a CPU/DSP using the micro-gather architecture and process may have as many state registers as needed in the first register group, and as many as pattern registers as needed in the second register group. The sizes of the first and second register groups may be determined based on the problems to be solved to allow the register group to have suitable bandwidth for the target computation. For example, in some other applications, the CPU/DSP may have 5 pattern/index registers or 16 pattern/index registers to hold more patterns for much more complex problems. But the systems, processes, methods, and architecture concepts described in this disclosure may still apply. On the other hand, the CPU/DSP may have smaller register arrays for the index registers and/or state registers for vector machines with smaller bandwidth.

In particular embodiments, the CPU/DSP may have a set of instructions that can be used to program the micro gathering and scatting architecture. All the operands may be based on vector registers and two register groups (e.g., which may be custom state banks). The first register group 110 $S_i$ may be 8×512-bit wide state registers to hold the input data from memory. The second register group 120 $Sp_i$ may be 4×512-bit wide to hold 16 patterns to gather data from the first group of registers and feed data to the input vector registers (V0, V1) 130A and 130B of the vector engine. In addition to the 16 patterns, each vector register pattern may be associated with an offset for the select operation. As such, each pattern may have 127 variants in this example. The selection instruction may enable 8×2 custom select which gathers data from $S_i$ registers of the first register group based on $Sp_i$ patterns and offset, and populate two input vector registers (V0, V1) 130A and 130B of the vector engine 140.

In particular embodiments, small matrix multiplication and inversion may be the core computation of many linear algebra problems.

TABLE 1

Small Matrix Multiplications Categorized as Vector Dot Products

| 1, 2, 1 | 1, 3, 1 | 1, 6, 1 |
|---|---|---|
| 3, 2, 3 | 3, 3, 3 | 3, 6, 1 |
| 6, 2, 6 | 6, 3, 6 | 6, 6, 1 |
| 3, 2, 2 | 6, 3, 3 | |
| 6, 2, 3 | 3, 3, 1 | |
| 6, 2, 2 | 6, 3, 1 | |
| 6, 2, 1 | | |
| 3, 2, 1 | | |
| 2, 2, 1 | | |

A programmable acceleration unit may be used for these operations to enhance ISA (instruction set architecture) of typical SIMD CPU or DSPs, but the design may be applicable to a custom hardware acceleration block as well. In computer vision's signal processing applications related to 3D landmarks, camera poses with 6 DOF (degree of freedom), and 2D projection images, typical matrix computation may involve some combinatory form of 6×3×2 matrix multiplication. Other typical operations of interest are shown in Table 1 below as vector dot products of 2, 3 and 6 dimensions respectively. The notation (n, m, k) may represent a multiplication of (n×k) matrix by a (m×k) matrix. In the case of n=k=1, the operation may be reduced to a dot product of a (1×m) vector by a (m×1) vector.

Figure 2:
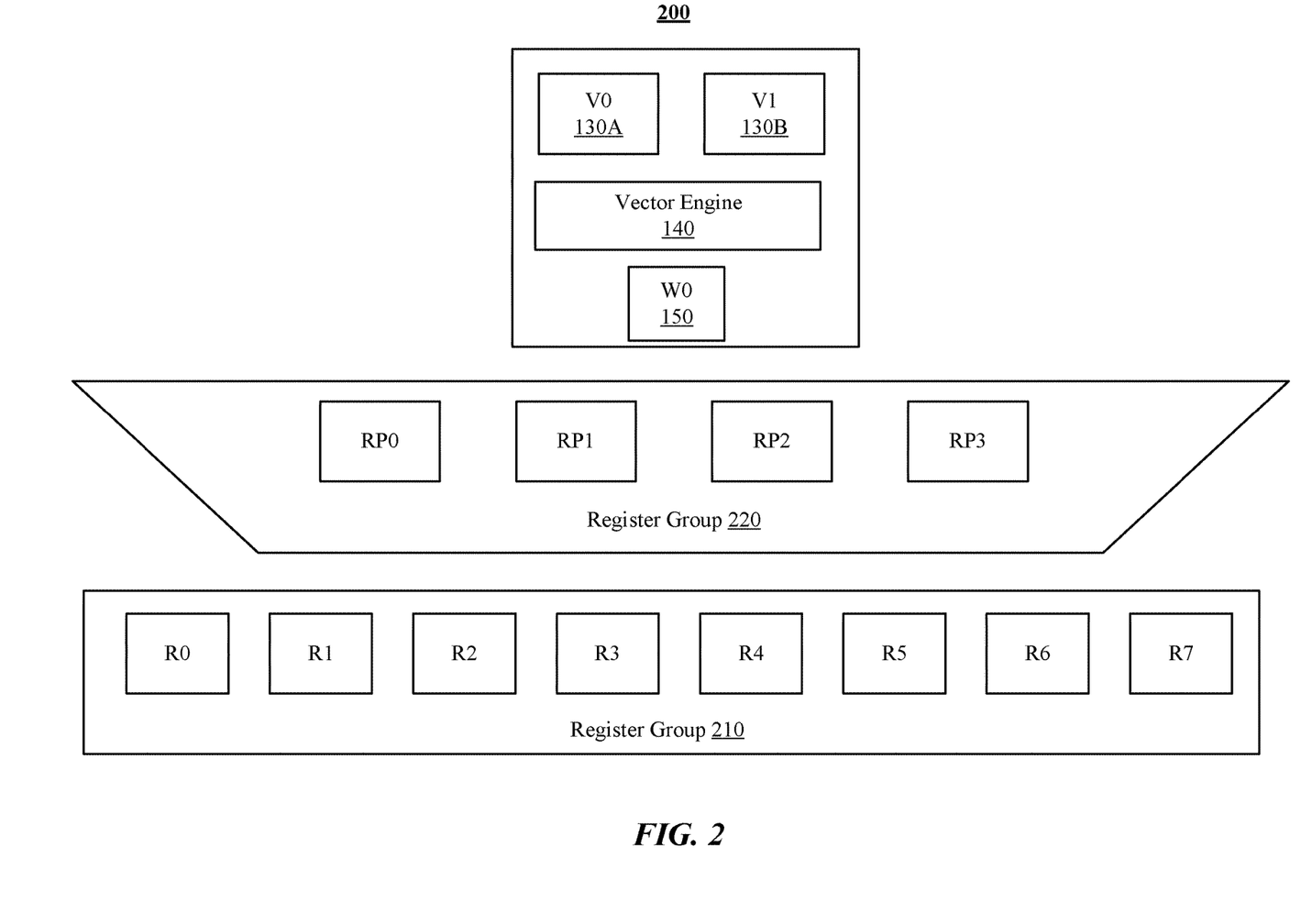
FIG. 2 illustrates an example architecture used in a micro-scattering process.

FIG. 2 illustrates an example architecture 200 used in a micro-scattering process. In particular embodiments, the micro-scattering process may be a reverse process with respect to the micro-gathering process but with separate set of registers and patterns. The pattern for scattering may be use case dependent. The data may be scattered into the memory in an order to get the ready for the next step computation. As an example and not by way of limitation, for the micro-scatter process, the CPU/DSP may use other group of registers which are different register groups from the register groups that are used in the micro-gather process. The vector engine 140 may first load the output data to an output vector register (W0) 150. Then, the CPU/DSP may determine a number of patterns to map the output data in the output vector 150 to the state registers (e.g., R0, R1, R2, R3, R4, R5, R6, R7) of the third register group 210. Such patterns may be determined based on the subsequent operations or computations on the output data. Then, the CPU/DSP may set the patterns to a fourth group 220 of registers (e.g., RP0, RP1, RP2, RP3), which may be an array of index registers. Each pattern may include a number of indexes or addresses to access the output data in the third group 210 of registers. After that, the CPU/DSP may load the output data from the output vector 150 to the third group 210 of registers according to the patterns stored in the fourth group of registers 220. The micro-scattering process may be repeated for other output vectors (if any). The data scattered to the state registers of the third register group 210 may be arranged in specific order according to the pre-determined patterns based on the subsequent computations or operations. After that, the CPU/DSP may load the data from the third register group 210 to a memory space, another vector engine, or another group of registers, which could be the first group of register 110 if the computation needs more iteration by the vector engine 140. As a result, by using the micro-scatter process, the CUP/DSP may efficiently prepare the data for subsequent operations and computations.

Figure 3:
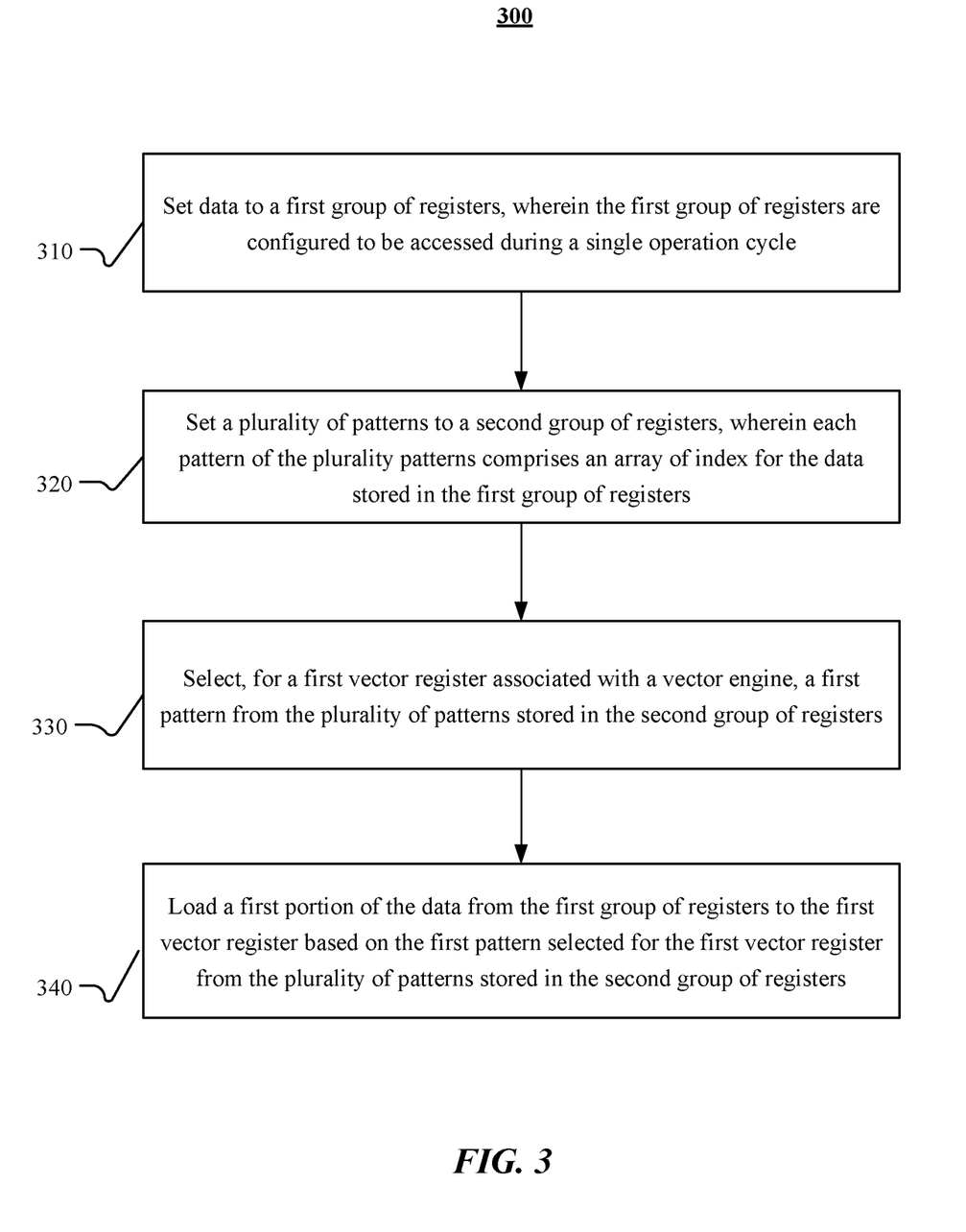
FIG. 3 illustrates an example method of using micro-scattering to prepare data for a vector engine.

FIG. 3 illustrates an example method 300 of using micro-scattering to prepare data for a vector engine. The method may begin at step 310, where a computing system may set data to a first group of registers of a processor (e.g., CPU/DSP). The first group of registers may be configured to be accessed during a single operation cycle. At step 320, the system may set a plurality of patterns to a second group of registers. Each pattern of the plurality patterns may have an array of index for the data stored in the first group of registers. At step 330, the system may select, for a first vector register associated with a vector engine, a first pattern from the plurality of patterns stored in the second group of register. At step 340, the system may load a first portion of the data from the first group of registers to the first vector register based on the first pattern selected for the first vector register from the plurality of patterns stored in the second group of registers.

In particular embodiments, the system may select, for a second vector register associated with the vector engine, a second pattern from the plurality of patterns stored in the second group of registers. The system may load a second portion of the data from the first group of registers to the second vector register based on the second pattern selected for the second vector register from the plurality of patterns stored in the second group of registers. In particular embodiments, the first pattern may correspond to a first math representation of a first problem to be solved by the vector engine. The second pattern may correspond to a second math representation of a second problem to be solved by the vector engine. The system may process, by the vector engine, the first portion and the second portion of the data to solve the first problem and the second problem parallelly.

In particular embodiments, the system may generate output data based on a processing result of the first portion or the second portion of the data. In particular embodiments, the system may set the output data to a third group of registers. The system may set a plurality of scatter patterns to a fourth group of registers. Each scatter pattern of the plurality scatter patterns may include an array of index for the output data stored in the third group of registers. The system may select a scatter pattern from the plurality of scatter patterns for a memory region. The system may load a first portion of the output data from the third group of registers into the memory region based on the scatter pattern selected for the memory region. In particular embodiments, the system may load a second portion of the output data from the third group of registers into a fifth group of registers. In particular embodiments, the first problem may be associated with a first matrix computation, and the second problem may be associated with a second matrix computation. The first pattern and the second pattern may be independent from each other.

In particular embodiments, the first vector register and the second vector register may be within a data processing pipeline of the vector engine. The vector engine may have a maximum utilization of a computation bandwidth. In particular embodiments, the vector engine may be a single instruction multiple data (SIMD) vector engine. In particular embodiments, the vector engine is a vector floating point engine (VFE). In particular embodiments, the first group of registers may include a plurality of state registers. The second group of registers may include a plurality of index registers. In particular embodiments, the data stored in the first group of registers may be loaded from a single cycle memory (SCM). and the first group of registers may correspond to a page of the single cycle memory (SCM). In particular embodiments, the data stored in the first group of registers may be generated by the vector engine in a previous round of computation or a second vector engine in a data processing pipeline.

In particular embodiments, the first group of registers may be configured to be accessed in an order corresponding to one or more patterns of the plurality of patterns stored in the second group of registers. In particular embodiments, the system may determine an offset value for each pattern of the plurality of patterns, wherein the first portion of data is loaded to the first vector register based on the first pattern and a first offset value associated with the first pattern. In particular embodiments, the first group of registers and the second group of registers may be set by a set of micro-selection instructions. In particular embodiments, the system may swap one or more patterns of the plurality of patterns stored in the second group of registers, an generate one or more new patterns based on the swapping results of the one or more patterns of the plurality of patterns. Such new patterns may be used to load data to the vector registers.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method of using micro-scattering to prepare data for a vector engine including the particular steps of the method of FIG. 3, this disclosure contemplates any suitable method of using micro-scattering to prepare data for a vector engine including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
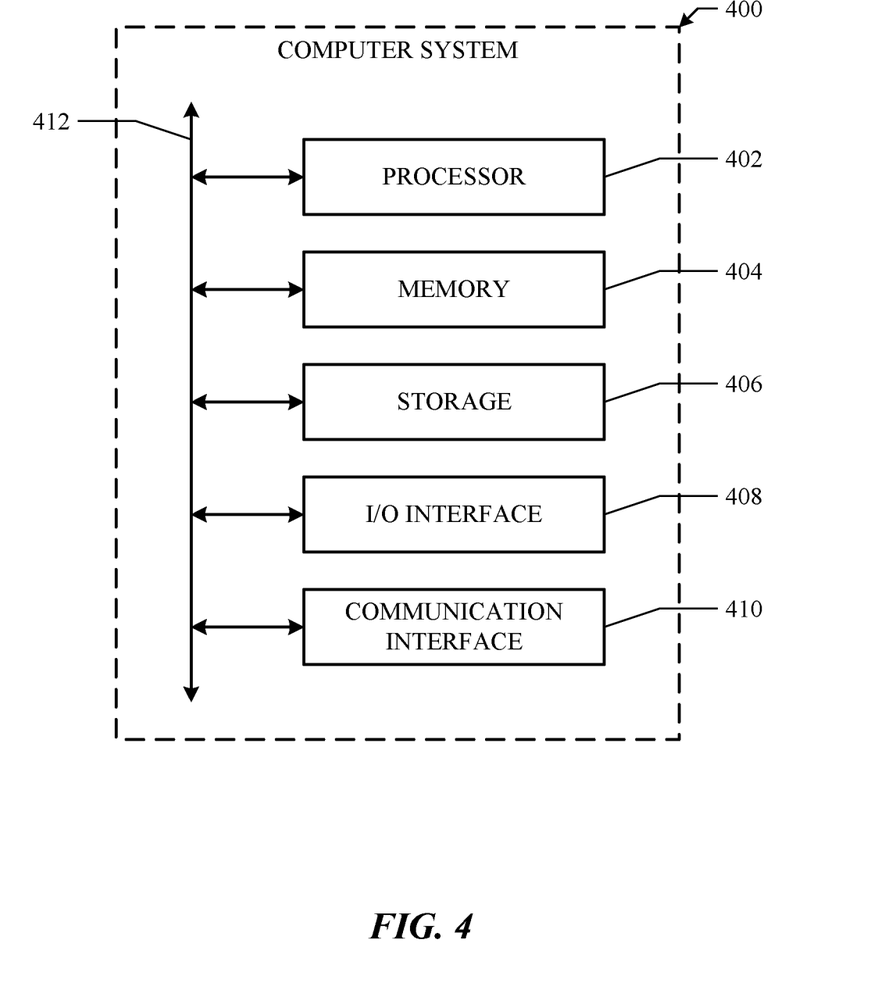
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   setting data to a first group of registers, wherein the first group of registers are configured to be accessed during a single operation cycle;
   setting a plurality of patterns to a second group of registers, wherein each pattern of the plurality of patterns comprises an array of index for the data stored in the first group of registers;
   selecting, for a first vector register associated with a vector engine, a first pattern from the plurality of patterns stored in the second group of registers; and
   loading a first portion of the data from the first group of registers to the first vector register based on the first pattern selected for the first vector register from the plurality of patterns stored in the second group of registers.

2. The method of claim 1, further comprising:
   selecting, for a second vector register associated with the vector engine, a second pattern from the plurality of patterns stored in the second group of registers; and
   loading a second portion of the data from the first group of registers to the second vector register based on the second pattern selected for the second vector register from the plurality of patterns stored in the second group of registers.

3. The method of claim 2, wherein the first pattern corresponds to a first representation of a first problem to be solved by the vector engine, wherein the second pattern corresponds to a second representation of a second problem to be solved by the vector engine, further comprising:
   processing, by the vector engine, the first portion and the second portion of the data to solve the first problem and the second problem parallelly.

4. The method of claim 2, further comprising generating output data based on a processing result of the first portion or the second portion of the data.

5. The method of claim 4, further comprising:
   setting the output data to a third group of registers;
   setting a plurality of scatter patterns to a fourth group of registers, wherein each scatter pattern of the plurality of scatter patterns comprises an array of index for the output data stored in the third group of registers; and
   selecting a scatter pattern from the plurality of scatter patterns for a memory region.

6. The method of claim 5, further comprising:
loading a first portion of the output data from the third group of registers into the memory region based on the scatter pattern selected for the memory region.

7. The method of claim 5, further comprising:
loading a second portion of the output data from the third group of registers into a fifth group of registers.

8. The method of claim 3, wherein the first problem is associated with a first matrix computation, and the second problem is associated with a second matrix computation, and wherein the first pattern and the second pattern are independent from each other.

9. The method of claim 3, wherein the first vector register and the second vector register are within a data processing pipeline of the vector engine, and wherein the vector engine has a maximum utilization of a computation bandwidth.

10. The method of claim 9, wherein the vector engine is a single instruction multiple data (SIMD) vector engine.

11. The method of claim 9, wherein the vector engine is a vector floating point engine (VFE).

12. The method of claim 1, wherein the first group of registers comprise a plurality of state registers, and wherein the second group of registers comprise a plurality of index registers.

13. The method of claim 1, wherein the data stored in the first group of registers is loaded from a single cycle memory (SCM), and wherein the first group of registers correspond to a page of the single cycle memory (SCM).

14. The method of claim 1, wherein the data stored in the first group of registers is generated by the vector engine in a previous round of computation or a second vector engine in a data processing pipeline.

15. The method of claim 1, wherein the first group of registers are configured to be accessed in an order corresponding to one or more patterns of the plurality of patterns stored in the second group of registers.

16. The method of claim 1, further comprising:
determining an offset value for each pattern of the plurality of patterns, wherein the first portion of data is loaded to the first vector register based on the first pattern and a first offset value associated with the first pattern.

17. The method of claim 1, wherein the first group of registers and the second group of registers are set by a set of micro-selection instructions.

18. The method of claim 1, further comprising:
swapping one or more patterns of the plurality of patterns stored in the second group of registers; and
generating one or more new patterns based on a swapping result of the one or more patterns of the plurality of patterns.

19. One or more computer-readable non-transitory storage media embodying software that is operable when executed to:
set data to a first group of registers, wherein the first group of registers are configured to be accessed during a single operation cycle;
set a plurality of patterns to a second group of registers, wherein each pattern of the plurality of patterns comprises an array of index for the data stored in the first group of registers;
select, for a first vector register associated with a vector engine, a first pattern from the plurality of patterns stored in the second group of registers; and
load a first portion of the data from the first group of registers to the first vector register based on the first pattern selected for the first vector register from the plurality of patterns stored in the second group of registers.

20. A system comprising:
one or more non-transitory computer-readable storage media embodying instructions; and
one or more processors coupled to the storage media and operable to execute the instructions to:
set data to a first group of registers, wherein the first group of registers are configured to be accessed during a single operation cycle;
set a plurality of patterns to a second group of registers, wherein each pattern of the plurality of patterns comprises an array of index for the data stored in the first group of registers;
select, for a first vector register associated with a vector engine, a first pattern from the plurality of patterns stored in the second group of registers; and
load a first portion of the data from the first group of registers to the first vector register based on the first pattern selected for the first vector register from the plurality of patterns stored in the second group of registers.

* * * * *